(12) United States Patent
Shibata et al.

(10) Patent No.: US 9,124,149 B2
(45) Date of Patent: Sep. 1, 2015

(54) DRIVE FORCE TRANSMISSION DEVICE

(71) Applicant: Nissan Motor Co., Ltd., Yokohama-shi, Kanagawa (JP)

(72) Inventors: Yuki Shibata, Nagoya (JP); Shigeru Ishii, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/374,004

(22) PCT Filed: Feb. 20, 2013

(86) PCT No.: PCT/JP2013/054188
§ 371 (c)(1),
(2) Date: Jul. 23, 2014

(87) PCT Pub. No.: WO2013/125581
PCT Pub. Date: Aug. 29, 2013

(65) Prior Publication Data
US 2015/0033889 A1 Feb. 5, 2015

(30) Foreign Application Priority Data

Feb. 24, 2012 (JP) .................................. 2012-038668

(51) Int. Cl.
| *F16H 57/02* | (2012.01) |
| *H02K 7/116* | (2006.01) |
| *F16H 57/029* | (2012.01) |
| *F16H 57/032* | (2012.01) |

(Continued)

(52) U.S. Cl.
CPC *H02K 7/116* (2013.01); *B60K 6/40* (2013.01); *B60K 6/48* (2013.01); *F16H 57/02* (2013.01); *F16H 57/029* (2013.01); *F16H 57/032* (2013.01); *H02K 5/10* (2013.01); *B60K 2006/4825* (2013.01); *F16H 2057/02034* (2013.01); *F16H 2057/02043* (2013.01); *Y02T 10/6221* (2013.01); *Y02T 10/6252* (2013.01)

(58) Field of Classification Search
CPC .......... F16H 2057/02043; F16H 57/02; H02K 7/116
See application file for complete search history.

(56) References Cited

U.S. PATENT DOCUMENTS

| 8,479,851 B2 * | 7/2013 | Mack et al. ................... 180/65.6 |
| 2008/0093135 A1 * | 4/2008 | Nomura et al. .............. 180/65.2 |

(Continued)

FOREIGN PATENT DOCUMENTS

| JP | 9-117090 A | 5/1997 |
| JP | 2009-108947 A | 5/2009 |

(Continued)

*Primary Examiner* — Vicky Johnson
(74) *Attorney, Agent, or Firm* — Global IP Counselors, LLP

(57) ABSTRACT

A drive force transmission device includes a motor, a transmission, a motor case, and a seal member. The motor is disposed in a dry space within a motor housing. The transmission is disposed in a wet space within a transmission case. The motor case covers an outer periphery of the motor housing and is coupled to the transmission case. The seal member is between the motor case and the motor housing and isolates the wet space and the outer space. The motor housing is divided into a divider wall housing dividing off the wet space and an outer wall housing dividing off the outer space, the divider wall housing being a material lighter than a material of the outer wall housing and integrally coupled thereto. The divider wall housing is divided from the outer wall housing at a position nearer to the dry space than the seal member.

4 Claims, 5 Drawing Sheets

(51) Int. Cl.
*H02K 5/10* (2006.01)
*B60K 6/40* (2007.10)
*B60K 6/48* (2007.10)

(56) References Cited

U.S. PATENT DOCUMENTS

2009/0000896 A1* 1/2009 Knowles ................... 192/48.1
2010/0005925 A1* 1/2010 Oomura ..................... 74/606 R
2011/0021120 A1* 1/2011 Bogardi et al. ............... 451/344
2011/0259698 A1* 10/2011 Arnold et al. ................ 192/48.1

FOREIGN PATENT DOCUMENTS

| JP | 2009-166591 A | 7/2009 |
| JP | 2010-139052 A | 6/2010 |
| JP | 2010-151313 A | 7/2010 |

* cited by examiner

DRIVE FORCE TRANSMISSION DEVICE

CROSS-REFERENCE TO RELATED APPLICATIONS

This application is a U.S. National stage application of International Application No. PCT/JP2013/054188, filed Feb. 20, 2013, which claims priority to Japanese Patent Application No. 2012-038668 filed in Japan on Feb. 24, 2012, the contents of which are hereby incorporated herein by reference.

BACKGROUND

1. Field of the Invention

The present invention relates to a drive force transmission device, applied to the drive system of an electric vehicle, in which a motor and a transmission are separated by a divider wall.

2. Background Information

The drive system of a conventional hybrid drive force transmission device is provided with a motor disposed in a dry space within a motor housing and a belt-driven continuously variable transmission disposed in a wet space within a transmission case. Also comprised is a motor case that covers the outer periphery of the motor housing, is coupled to the transmission case, and forms an outer space between itself and the motor housing. An arrangement further comprising an O-ring that is interposed between the motor case and the motor housing and isolates the outer space and the wet space from each other is also known (see, for example, Japanese Laid-Open Patent Application No. 2010-151313, FIG. 7).

SUMMARY

However, in a conventional hybrid drive force transmission device, the motor housing involves a single-part arrangement comprising an integrated divider wall section separating the dry space and the wet space and outer wall section separating the dry space and the outer space. For this reason, the motor housing must be made of cast iron due to the strength requirements of the outer wall section, which retains the stator of the motor, leading to problematic increases in weight.

The present invention was conceived in view of the problem described above, and has an object of providing a drive force transmission device in which a motor housing is capable of isolating a wet space and a dry space from each other while achieving a balance between reducing weight and meeting strength requirements.

In order to achieve the abovementioned object, a drive force transmission device according to the present invention includes a motor disposed in a dry space within a motor housing, a transmission disposed in a wet space within a transmission case, a motor case that covers the outer periphery of the motor housing and is coupled to the transmission case, so that an outer space is formed between the motor case and the motor housing, and a seal member, interposed between the motor case and the motor housing, for isolating the wet space and the outer space from each other.

In this drive force transmission device, the motor housing is divided into a divider wall housing dividing off the wet space and an outer wall housing dividing off the outer space, and the divider wall housing is constituted by a material lighter than that of the outer wall housing and is integrally coupled thereto. A characteristic of the invention is that the position at which the divider wall housing is divided from the outer wall housing is set nearer to the dry space than the seal member.

As described above, the motor housing is divided into the divider wall housing and the outer wall housing, and the divider wall housing is constituted by a material that is lighter than the outer wall housing and is integrally coupled thereto. As a result, the lighter weight of the divider wall housing allows the weight of the motor housing to be reduced. Meanwhile, there are no restrictions on the selection of material for the outer wall housing, meaning that a material satisfying the strength requirements demanded of the motor housing can be used therefor.

In addition, the position at which the divider wall housing is divided from the outer wall housing is set nearer to the dry space than the seal member. As a result, the wet space in which the transmission is disposed and the dry space in which the motor is disposed are separated from each other by a divider wall housing not comprising a dividing position in the middle thereof, thereby isolating the wet space and the dry space from each other. As a result, the motor housing is capable of isolating the wet space and the dry space from each other while achieving a balance between reducing weight and meeting strength requirements.

BRIEF DESCRIPTIONS OF THE DRAWINGS

Referring now to the attached drawings which form a part of this original disclosure.

DETAILED DESCRIPTION OF EMBODIMENTS

Figure 1:
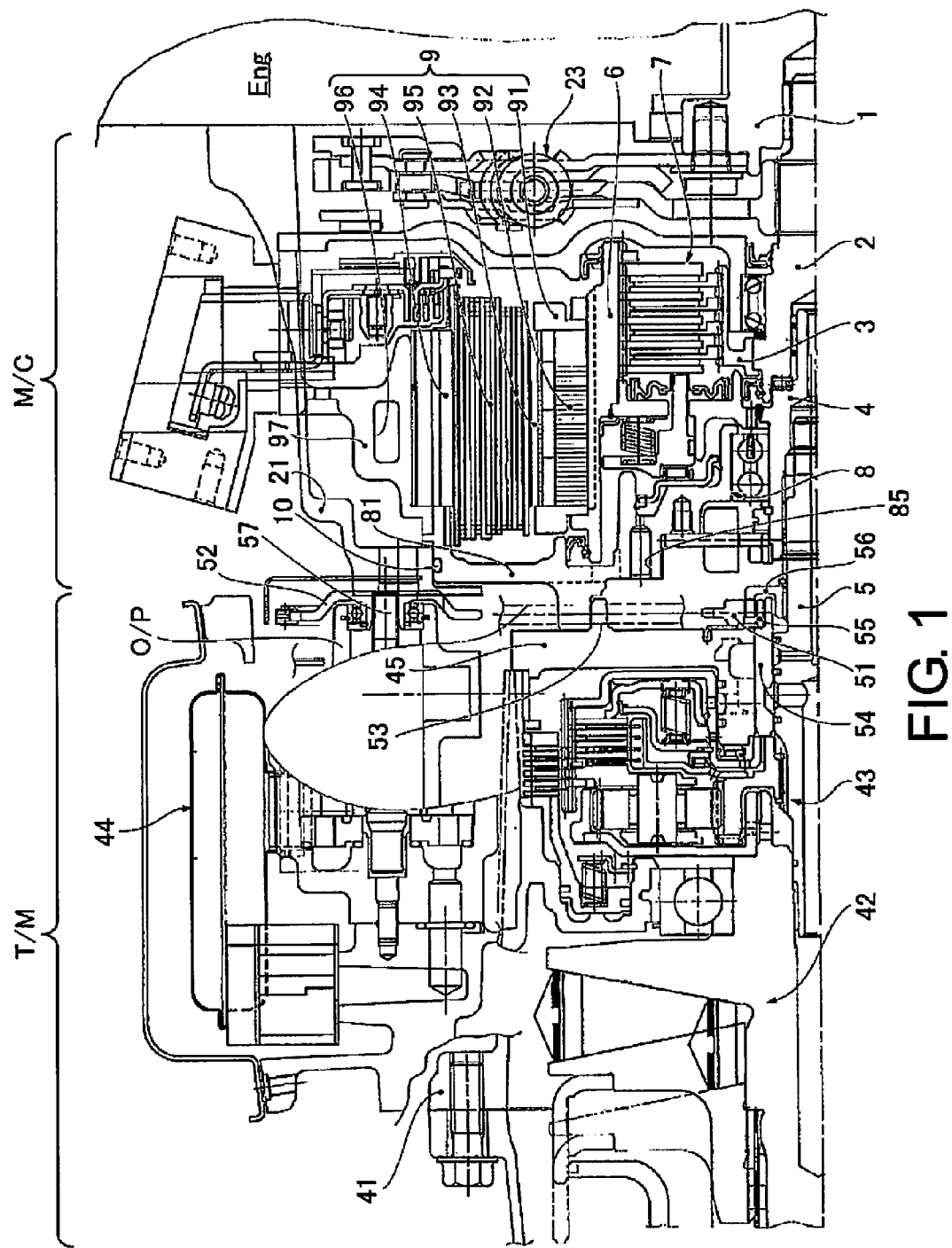
FIG. 1 is an overall schematic view of a hybrid drive force transmission device (an example of a drive force transmission device) applied to a front-wheel-drive hybrid vehicle according to a first embodiment.

The following is a description of a best mode for carrying out the drive force transmission device according to the present invention based on a first embodiment shown in the drawings.

Embodiment 1

First, the configuration of the first embodiment will be described.

The configuration of the hybrid drive force transmission device (an example of a drive force transmission device) according to the first embodiment will be described in terms of the overall system configuration, the clutch configuration of the motor and clutch unit, and the motor housing configuration of the motor and clutch unit.

Overall System Configuration

FIG. 1 is an overall schematic view of a hybrid drive force transmission device applied to a front-wheel-drive hybrid vehicle according to a first embodiment. The following is a description of the overall system configuration based in FIG. 1.

As shown in FIG. 1, the hybrid drive force transmission device is provided with an engine Eng, a motor and clutch unit M/C, and a transmission unit T/M. The motor and clutch unit M/C, which is coupled to an engine output shaft 1 of the engine Eng, comprises a clutch hub shaft 2, a clutch hub 3, a clutch drum shaft 4, a transmission input shaft 5, a clutch drum 6, a dry multi-plate clutch 7, a slave cylinder 8, and a motor/generator 9.

The slave cylinder 8, which hydraulically controls the engagement and disengagement of the dry multi-plate clutch 7, is generally referred to as a concentric slave cylinder (CSC).

In the hybrid drive force transmission device, when the normally open dry multi-plate clutch 7 is disengaged, the motor/generator 9 and the transmission input shaft 5 are coupled by the clutch drum 6 and the clutch drum shaft 4. An "EV driving mode" in which the motor/generator 9 is the drive source is thus entered. When the dry multi-plate clutch 7 is hydraulically engaged, the engine Eng, the motor/generator 9, and the transmission input shaft 5 are coupled by the dry multi-plate clutch 7. An "HV driving mode" in which the engine Eng and the motor/generator 9 are the drive sources is thus entered. The engine output shaft 1 and the clutch hub shaft 2 are coupled by a damper 23.

The motor and clutch unit M/C comprises the dry multi-plate clutch 7, the slave cylinder 8, and the motor/generator 9 within a unit case 21. The dry multi-plate clutch 7 is coupled and connected to the engine Eng, and connects and disconnects the transmission of drive force from the engine Eng. The slave cylinder 8 hydraulically controls the engagement and disengagement of the dry multi-plate clutch 7. The motor/generator 9 is disposed at a position on the outer circumference of the clutch drum 6 of the dry multi-plate clutch 7, and engages in the transmission of motive force to and from the transmission input shaft 5. The motor and clutch unit M/C is provided with a divider wall housing 81 comprising a first clutch pressure fluid passage 85 leading to the slave cylinder 8, the seal integrity thereby being maintained by an O-ring 10.

The motor/generator 9 is a synchronous AC electric motor, and comprises a rotor support frame 91 provided integrally with the clutch drum 6, and a rotor 92, supported by and affixed to the rotor support frame 91, in which a permanent magnet is embedded. Also comprised are a stator 94 affixed to an outer wall housing 97 and separated from the rotor 92 by an air gap 93, and a stator coil 95 wound around the stator 94. A water jacket 96 through which cooling water is flushed is formed on the outer wall housing 97.

The transmission unit T/M is coupled and connected to the motor and clutch unit M/C, and comprises a transmission case 41, a V-belt-driven continuously variable transmission mechanism 42, and an oil pump O/P. The V-belt continuously variable transmission mechanism 42 is built into the transmission case 41 and features a V-belt wrapped between two pulleys; an infinite number of gear ratios can be obtained by altering the belt contact radius of the pulleys. The oil pump O/P is a hydraulic pressure source for generating hydraulic pressure required at various locations, and, using oil pump pressure as source pressure, directs hydraulic pressure from a control valve, not shown in the drawings, for adjusting various types of pressure, such as gear shift hydraulic pressure supplied to the pulley chambers or clutch/brake hydraulic pressure, to locations where hydraulic pressure is required. The transmission unit T/M is further provided with a forward/reverse switching mechanism 43, an oil tank 44, and an endplate 45. The endplate 45 comprises a second clutch pressure fluid passage 47 (FIG. 2).

The oil pump O/P is driven by rotational drive torque from the transmission input shaft 5 via a chain drive mechanism. The chain drive mechanism comprises a driving sprocket 51 that rotates in tandem with the rotational driving of the transmission input shaft 5, a driven sprocket 52 for rotationally driving a pump shaft 57, and a chain 53 wrapped around the sprockets 51, 52. The driving sprocket 51 is interposed between the transmission input shaft 5 and the endplate 45, and is supported by a bushing 55 so as to be capable of rotating with respect to a stator shaft 54 affixed to the transmission case 41. Rotational drive torque from the transmission input shaft 5 is transmitted by a first adapter 56 that mates via a spline with the transmission input shaft 5 and mates via a claw with the driving sprocket 51.

Clutch Configuration of Motor and Clutch Unit

Figure 2:
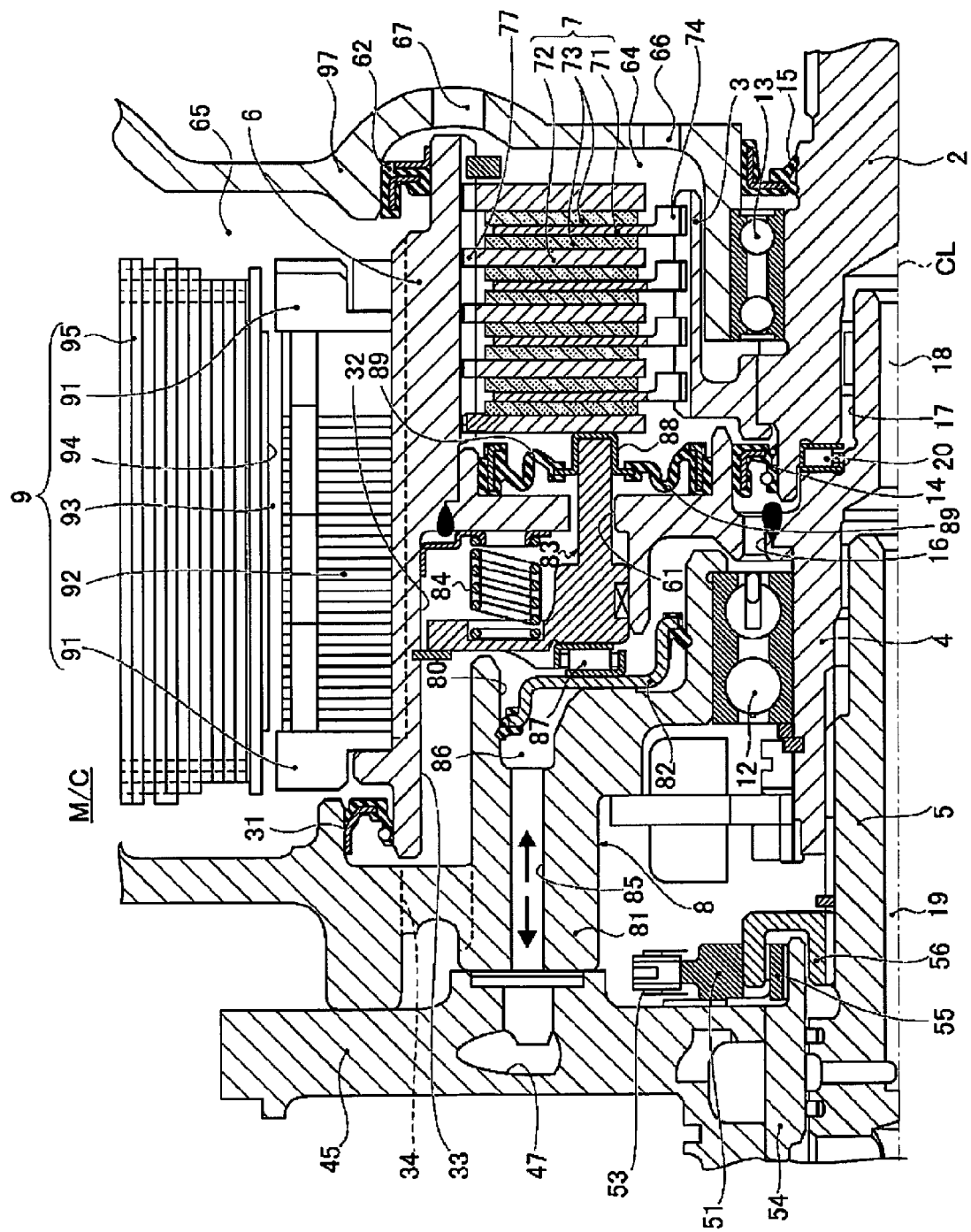
FIG. 2 is a cross-sectional view of the clutch configuration of a motor and clutch unit of the hybrid drive force transmission device according to the first embodiment.
Figure 3:
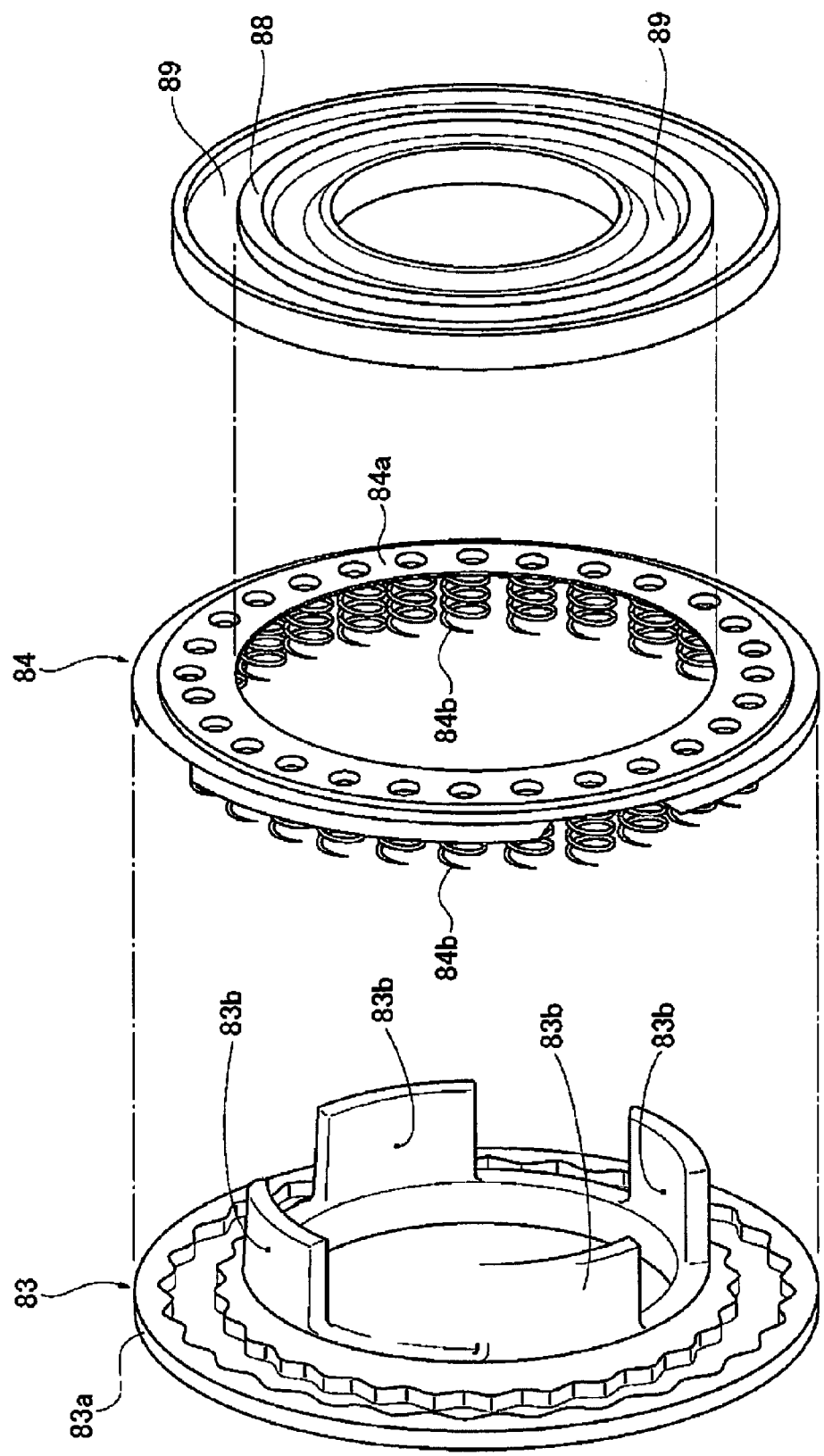
FIG. 3 is an exploded perspective view of piston assembly pieces for a dry multi-plate clutch of the hybrid drive force transmission device according to the first embodiment.

FIG. 2 is a cross-sectional view of the clutch configuration of the motor and clutch unit of the hybrid drive force transmission device according to the first embodiment, and FIG. 3 is an exploded perspective view of piston assembly pieces for a dry multi-plate clutch of the hybrid drive force transmission device according to the first embodiment. The clutch configuration of the motor and clutch unit M/C will now be described with reference to FIGS. 2 and 3.

The clutch hub 3 is coupled to the engine output shaft 1 of the engine Eng. A drive plate 71 of the dry multi-plate clutch 7 is splined to the clutch hub 3, as shown in FIG. 2.

The clutch drum 6 is coupled to the transmission input shaft 5 of the transmission unit T/M. A driven plate 72 of the dry multi-plate clutch 7 is splined to the clutch drum 6, as shown in FIG. 2.

The dry multi-plate clutch 7 is configured by alternately arranging a plurality of drive plates 71, to both sides of which are attached frictional faces 73, 73, and driven plates 72 between the clutch hub 3 and the clutch drum 6. Engaging the dry multi-plate clutch 7 allows torque to be transmitted between the clutch hub 3 and the clutch drum 6, and releasing the dry multi-plate clutch 7 interrupts the transmission of torque between the clutch hub 3 and the clutch drum 6.

The slave cylinder 8 is a hydraulic actuator for controlling the engagement and disengagement of the dry multi-plate clutch 7, and is disposed at a position between the transmission unit T/M and the clutch drum 6. As shown in FIG. 2, the slave cylinder 8 comprises a piston 82 capable of sliding in a cylinder hole 80 in the divider wall housing 81, a first clutch pressure fluid passage 85, formed in the divider wall housing 81, for directing clutch pressure generated by the transmission unit T/M, and a cylinder fluid chamber 86 communicating with the first clutch pressure fluid passage 85. As shown in FIG. 2, a needle bearing 87, a piston arm 83, a return spring 84, and an arm indentation plate 88 are interposed between the piston 82 and the dry multi-plate clutch 7.

The piston arm 83 generates pressure for the dry multi-plate clutch 7 from the pressure from the slave cylinder 8, and is capable of sliding in a through-hole 61 formed in the clutch drum 6. The return spring 84 is interposed between the piston arm 83 and the clutch drum 6. The needle bearing 87 is interposed between the piston 82 and the piston arm 83, and keeps the piston 82 from rotating along with the piston arm 83. The arm indentation plate 88 is provided integrally with elastic accordion support members 89, 89, and inner and outer circumferential parts of the elastic accordion support members 89, 89 are pressure-fitted against the clutch drum 6. Leaked fluid from the piston arm 83 is prevented from flowing into the dry multi-plate clutch 7 by the arm indentation plate 88 and the elastic accordion support members 89, 89. That is, the arm indentation plate 88 and elastic accordion support members 89 sealed and immobilized at the position where the piston arm attaches to the clutch drum 6 serve to separate a wet space in which the slave cylinder 8 is disposed from the dry space in which the dry multi-plate clutch 7 is disposed.

As shown in FIG. 3, the piston arm 83 is constituted by a ring-shaped arm body 83a, and arm projections 83b projecting from the arm body 83a at four locations.

As shown in FIG. 3, the return spring 84 is constituted by a ring-shaped spring support plate 84a and a plurality of coil springs 84b affixed to the spring support plate 84a.

As shown in FIG. 2, the arm indentation plate 88 is pressed in place by the arm projections 83b of the piston arm 83. As shown in FIG. 3, the elastic accordion support members 89, 89 are integrally provided inside and outside the arm indentation plate 88.

A leaked/recovered fluid passage according to the first embodiment comprises a first bearing 12, a first seal member 31, a leaked fluid passage 32, a first recovered fluid passage 33, and a second recovered fluid passage 34, as shown in FIG. 2. Specifically, leaked fluid from the sliding part of the piston 82 passes through the first recovered fluid passage 33 and the second recovered fluid passage 34, which are sealed by the first seal member 31, and returns to the transmission unit T/M. In addition, leaked fluid from the sliding part of the piston arm 83 passes through the leaked fluid passage 32, which is sealed by an elastic divider member (the arm indentation plate 88 and elastic accordion support members 89, 89), and the first recovered fluid passage 33 and the second recovered fluid passage 34, which are sealed by the first seal member 31, and returns to the transmission unit T/M.

A bearing lubricant passage according to the first embodiment comprises a needle bearing 20, a second seal member 14, a first shaft core fluid passage 19, a second shaft core fluid passage 18, a lubricant passage 16, and a gap 17, as shown in FIG. 2. The bearing lubricant passage lubricates the bearings by carrying bearing lubricant from the transmission unit T/M through the needle bearing 20, the first bearing 12, which rotatably supports the clutch drum 6 with respect to the divider wall housing 81, and the needle bearing 87, which is interposed between the piston 82 and the piston arm 83, before returning it to the transmission unit T/M.

The second seal member 14 is disposed between the clutch hub 3 and the clutch drum 6, as shown in FIG. 2. The second seal member 14 serves to prevent bearing lubricant from flowing from the wet space in which the slave cylinder 8 is disposed into the dry space in which the dry multi-plate clutch 7 is disposed.

To describe the wear debris ejection mechanism of the dry multi-plate clutch 7, the dry multi-plate clutch 7 is disposed within a clutch chamber 64 constituted by the closed space surrounded by the clutch hub shaft 2, the clutch hub 3, the clutch cover 6, and the outer wall housing 97, as shown in FIG. 2. The component members of the dry multi-plate clutch 7 are a drive plate 71, a driven plate 72, a frictional face 73, and an outer wall housing 97.

The drive plate 71 is splined to the clutch hub 3, and comprises ventilation holes 74 at the position of the splined connection with the clutch hub 3 for admitting an air stream flowing in the axial direction.

The driven plate 72 is splined to the clutch drum 6, and comprises ventilation gaps 77 for admitting an air stream flowing in the axial direction at the position of the splined connection with the clutch drum 6.

A frictional face 73 is provided on both sides of the drive plate 71, and frictional surfaces thereof are pressed against the surface of the driven plate 72 when the clutch is engaged.

The outer wall housing 97 is integrally pressure-fitted to the divider wall housing 81 supported by the first bearing 12 with respect to the clutch drum shaft 4, and covers the motor/generator 9 and the dry multi-plate clutch 7. Specifically, the front cover 60 is a motionless member that is supported with respect to the clutch hub shaft 2 by a second bearing 13 and is sealed by a cover seal 15. That part of the interior space formed by the front cover 60 and cylinder housing 81 being covered nearer a clutch rotary shaft CL (equivalent to a rotor shaft) constitutes the clutch chamber 64 in which the dry multi-plate clutch 7 is housed, and the outer space of the clutch chamber 64 constitutes a motor chamber 65 in which the motor/generator 9 is housed. The clutch chamber 64 and the motor chamber 65, which are divided by a dust seal member 62, are dry spaces into which the flow of oil is blocked.

Motor Housing Configuration of the Motor and Clutch Unit

Figure 4:
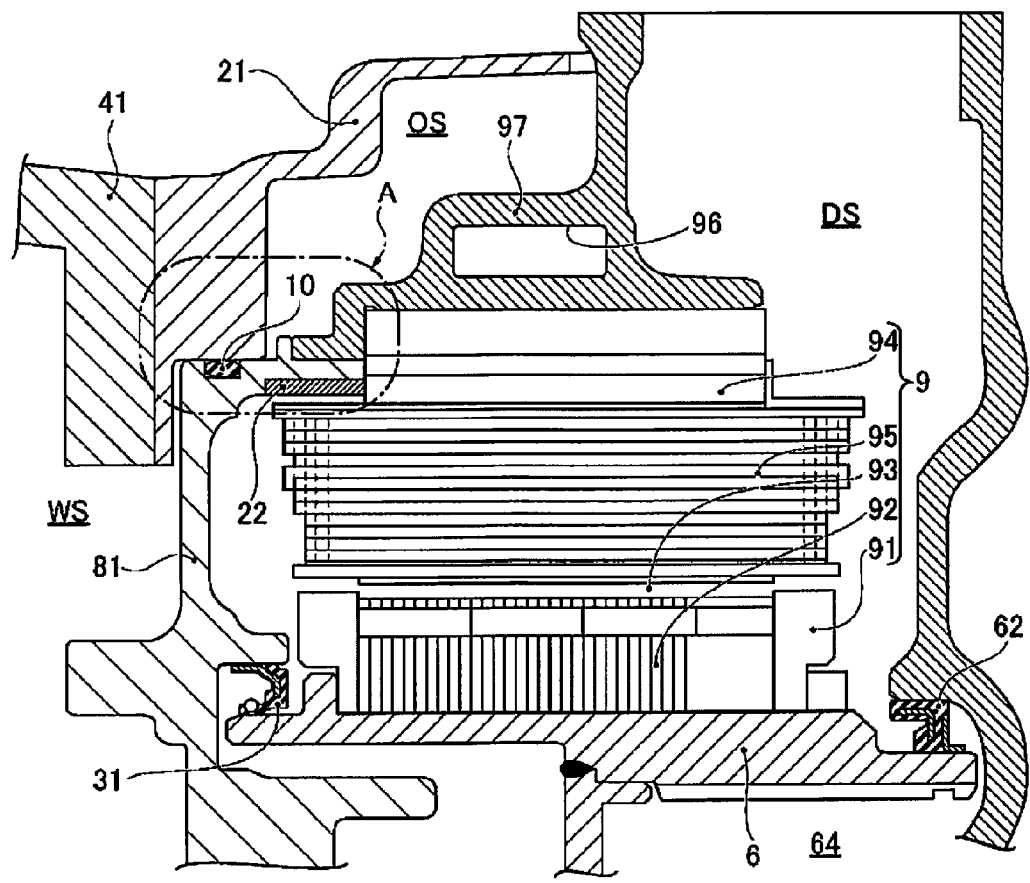
FIG. 4 is a cross-sectional view of the motor housing configuration of a motor and clutch unit of the hybrid drive force transmission device according to the first embodiment.
Figure 5:
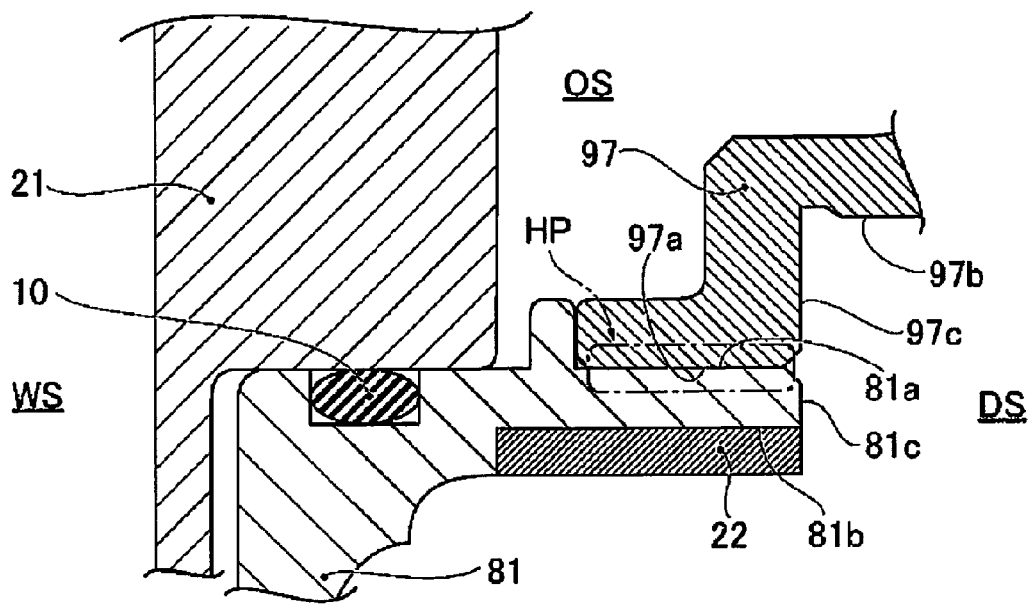
FIG. 5 is a magnified cross-sectional view of section A (a motor housing division section) of the hybrid drive force transmission device according to the first embodiment shown in FIG. 4.

FIG. 4 is a cross-sectional view of the motor housing configuration of the motor and clutch unit of the hybrid drive force transmission device according to the first embodiment, and FIG. 5 is a magnified cross-sectional view of section A in FIG. 4 (motor housing division section). The motor housing configuration of the motor and clutch unit M/C will now be described with reference to FIGS. 4 and 5.

As shown in FIG. 4, the motor and clutch unit M/C is provided with the motor/generator 9 (motor), the V-belt-driven continuously variable transmission mechanism 42 (transmission), the transmission case 41, the unit case 21 (motor case), the O-ring 10 (seal member), and a sleeve 22. The motor housing in which the motor/generator 9 is disposed and housed is divided into the divider wall housing 81 and the outer wall housing 97. The inner space surrounded by the transmission case 41, the unit case 21, the divider wall housing 81, and the outer wall housing 97 is divided into a dry space DS, a wet space WS, and an outer space OS.

The motor/generator 9 is disposed in the dry space DS formed by the divider wall housing 81 and the outer wall housing 97. The dry space DS is formed so as to block off transmission fluid from the wet space WS, cooling water from the outer space OS, and wear debris from the clutch chamber 64.

The V-belt-driven continuously variable transmission mechanism 42 engages in continuously variable transmission via control hydraulic pressure, and is disposed in the wet space WS of the transmission case 41. The bottom of the wet space WS is filled with transmission fluid that scatters and churns therewithin, and communicates with the wet space within which the slave cylinder 8 is disposed.

The unit case 21 covers part of the divider wall housing 81 and the outer periphery of the outer wall housing 97 and is coupled to the transmission case 41, forming an outer space OS between part of the divider wall housing 81 and the outer wall housing 97. The outer space OS communicates with the external atmosphere, and water from the water jacket 96 for admitting water formed in the outer wall housing 97 scatters and churns therewithin.

The O-ring 10 is a seal that is interposed between the unit case 21 and the divider wall housing 81, and isolates the wet space WS and the outer space OS from each other. The O-ring 10 is set in a ring groove formed in the divider wall housing 81 so that the elastic deformation thereof ensures seal integrity when the divider wall housing 81 is assembled into the unit case 21.

The divider wall housing 81 and the outer wall housing 97 are formed from what was previously an integrated cast iron motor housing divided into a dividing wall (the divider wall housing 81) dividing off the wet space WS and a dividing wall (the outer wall housing 97) dividing off the outer space OS. The divider wall housing 81 has been changed to die-cast aluminum, and the outer wall housing 97 has been left as cast iron. In other words, the material of the divider wall housing 81 (aluminum alloy) is lighter than the material of the outer wall housing 97 (iron or an iron alloy), and the two are integrally coupled to form the motor housing.

As shown in FIGS. 4 and 5, the position at which the divider wall housing 81 is divided from the outer wall housing 97 is set nearer the dry space DS than the O-ring 10. More specifically, the dividing position is set nearer the O-ring 10 than a motor pressure fitting surface 97b to which the circumferential surface of the stator 94 of the motor/generator 9 is pressure fitted. In other words, the dividing position is at a position where a motor-abutting surface 97c abutting an end surface of the stator 94 of the motor/generator 9 is divided into radially inward and outward portions (i.e., a motor-abutting surface 81c towards the divider wall housing 81). A divider wall circumferential division surface 81a and an outer wall circumferential division surface 97a formed at the respective dividing positions are pressed together. That is, the divider wall housing 81 and the outer wall housing 97 are integrally joined by a housing pressure-fit section HP.

As shown in FIGS. 4 and 5, the sleeve 22 is a ring-shaped member of the same material as the outer wall housing 97 (i.e., iron or an iron alloy) that has a ring width greater than the axial direction length of the housing pressure-fit section HP, and is pressure-fitted to a recessed surface section 81b located on an inner diameter side of the housing pressure-fit section HP.

Next, the operation of the present invention will be described.

The operation of the hybrid drive force transmission device according to the first embodiment will be described in terms of its operation in balancing reducing motor housing weight and meeting strength requirements, its operation in preventing reductions in pressure fitting force between the sections of the divided housing, and its operation in mutually isolating the three spaces formed inside and outside the motor housing.

Motor Housing Weight Reduction and Strength Requirement-Balancing Operation

If the motor housing remained made of an iron material, strength requirements would be met, but weight would be increased. However, if the material of the motor housing were simply changed from an iron material to an aluminum material, a reduction in weight could be achieved, but strength requirements would not be met. In other words, steps must be taken to strike a balance between reducing the weight of the motor housing and satisfying strength requirements. The motor housing weight reduction and strength requirement-balancing operation will now be described.

In the first embodiment, the motor housing is divided into the divider wall housing 81 and the outer wall housing 97, and the divider wall housing 81 integrally coupled to the outer wall housing 97 while being made of a lighter material (die-cast aluminum) than the latter. This configuration reduces the weight of the divider wall housing 81, allowing the weight of the motor housing as a whole to be reduced. Meanwhile, there are no restrictions upon the material used for the outer wall housing 97; any material capable of meeting the strength required to hold the motor/generator 9 can be used.

Accordingly, dividing the motor housing into two parts and forming the divider wall housing 81 from a material lighter than that used for the outer wall housing 97 allows a balance to be struck between reducing the weight of the motor housing and satisfying strength requirements. Reducing the weight of the motor housing also contributes to reducing the weight of the hybrid drive force transmission device.

In the first embodiment, the position of the division between the divider wall housing 81 and the outer wall housing 97 is set at a position nearer the O-ring 10 than the motor pressure fitting surface 97b to which the circumferential surface of the stator 94 of the motor/generator 9 is pressure-fitted. In this configuration, the circumferential surface of the stator 94 of the motor/generator 9 is pressure-fitted to the motor pressure fitting surface 97b of the cast iron. As a result, it is possible to hold the stator 94 of the motor/generator 9 against the outer wall housing 97 with the same level of strength as the pressure fitting strength against the motor housing.

Operation in Preventing Reductions in Pressure Fitting Force Between the Divided Housings Having the pressure-fitted divider wall housing 81 and outer wall housing 97 be of different materials, as discussed above, creates the risk of reductions in pressure fitting force between the two housings 81, 97 due to changes in temperature. It is therefore necessary to take steps to prevent reductions in pressure fitting force regardless of changes in temperature. The operation of preventing reductions in pressure fitting force between the divided housings reflecting this need will now be described.

If, for example, different members were pressure-joined, the amount of contraction caused by a change from normal temperature to a low temperature would be less for the outer wall housing 97 than the divider wall housing 81 if the linear expansion coefficient of the outer wall housing 97 (cast iron) is less than that of the divider wall housing 81 (aluminum). This reduces the pressure-fit contact area between the outer wall housing 97 and the divider wall housing 81 and creates a risk of pressure fitting failure.

In the first embodiment, by contrast, the sleeve 22, which is of the same material (i.e., iron) as the outer wall housing 97, is pressure-fitted to a position on the inner diameter side of the housing pressure-fit section HP of the aluminum divider wall housing 81.

This configuration creates a structure in which the aluminum divider wall housing 81 is sandwiched from within and without by the outer wall housing 97 and the sleeve 22, which are of the same material (i.e., iron). As result, when there is a temperature change from a normal temperature to a low temperature, the amount of contraction in the inner diameter of the divider wall housing 81 is minimized by the sleeve 22, and pressure fitting force is generated between the divider wall housing 81 and the sleeve 22. The generated pressure fitting force expands the outer diameter of the divider wall housing 81.

It is thus possible to prevent reductions in pressure fitting force (pressure fitting contact area) between the divider wall housing 81 and the housing pressure-fit section HP of the outer wall housing 97 even upon changes in temperature.

Operation of Mutually Isolating Three Spaces Formed Inside and Outside Motor Housing As described above, even when the motor housing is divided into two sections, it is just as necessary to ensure the same level of seal integrity between the three spaces formed inside and outside the motor housing as in the case of a single integrated motor housing. The operation of mutually isolating the three spaces formed inside and outside the motor housing in reflection of this need will now be described with reference to FIGS. 6 and 7.

Figure 6:
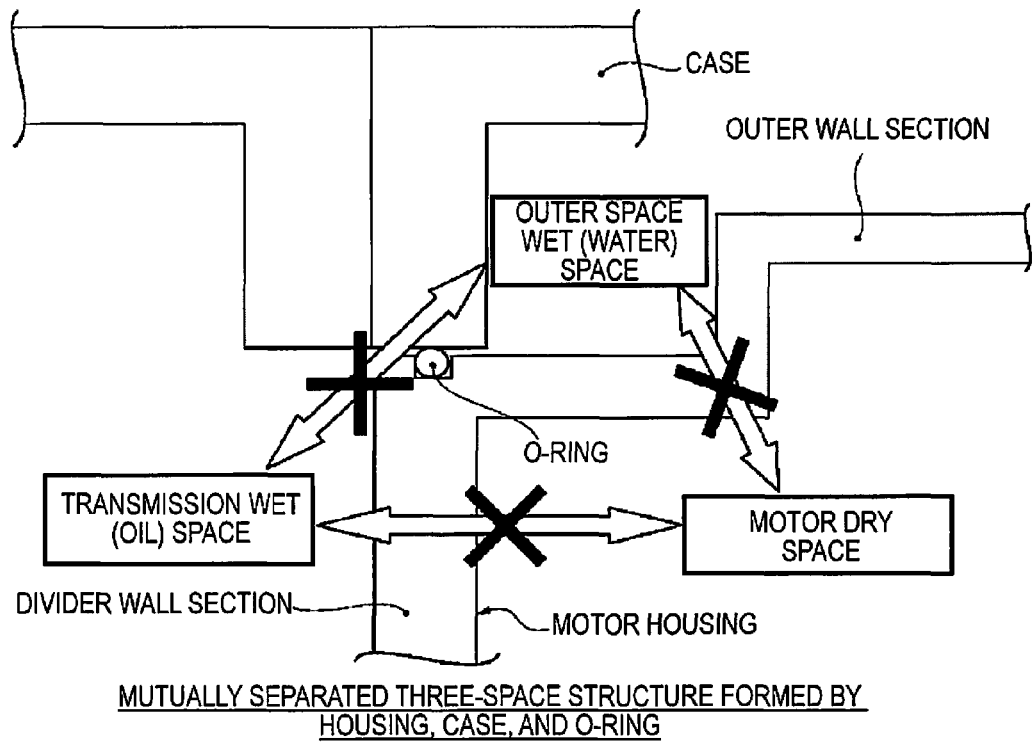
FIG. 6 is an illustration of a three-space mutual isolation operation in a hybrid drive force transmission device according to a comparative example.

Using an arrangement featuring a single integrated motor housing as a comparative example, the three spaces constituted by the dry space, the wet space, and the outer space are isolated from each other as shown in FIG. 6.

(a) The wet space and the outer space are isolated from each other by the O-ring.

(b) The wet space and the dry space are isolated from each other by the divider wall section of the motor housing.

(c) The dry space and the outer space are isolated from each other by the outer wall section of the motor housing.

Figure 7:
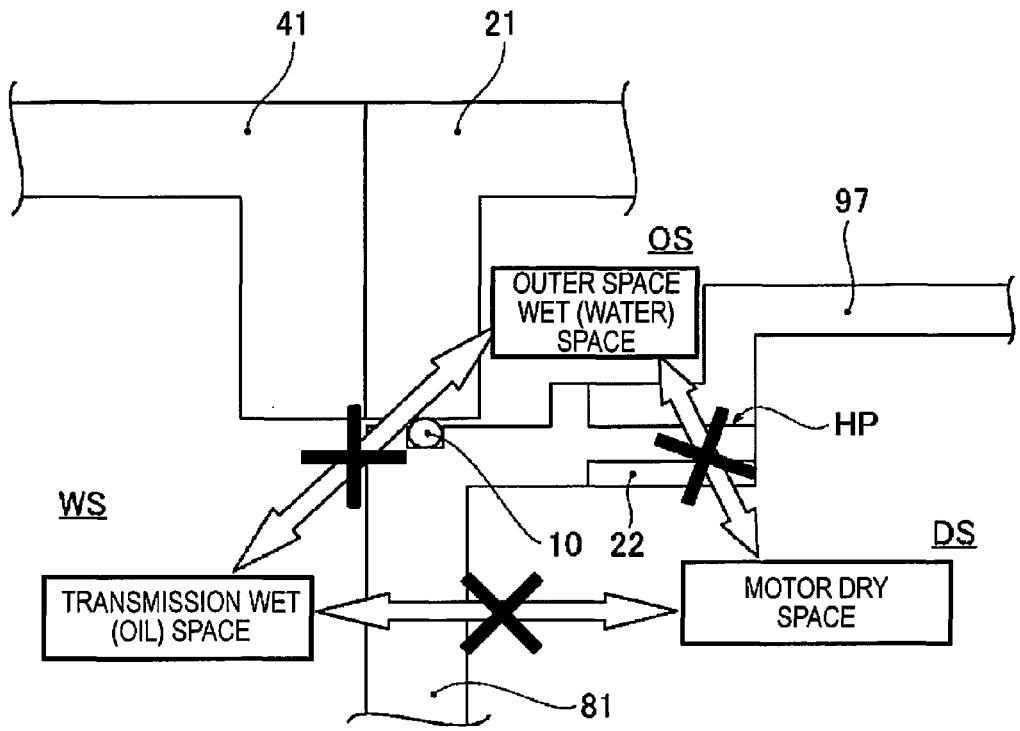
FIG. 7 is an illustration of a three-space mutual isolation operation in a hybrid drive force transmission device according to the first example.

By contrast, in the first embodiment, the three spaces constituted by the dry space DS, the wet space WS, and the outer space OS are isolated from each other as shown in FIG. 7.

(a) The wet space WS and the outer space OS are isolated from each other by the O-ring 10, as in the comparative example.

(b) The wet space WS and the dry space DS are isolated from each other by the divider wall housing 81.

Specifically, in the first embodiment, the position of the division between the divider wall housing 81 and the outer wall housing 97 is set nearer the dry space DS than the O-ring 10.

As a result, the wet space WS and the dry space DS are divided by the divider wall housing 81, which does not comprise a dividing position in the middle thereof, thus isolating the wet space WS and the dry space DS from each other as in the comparative example.

(c) The dry space DS and the outer space OS are isolated from each other by part of the divider wall housing 81, the outer wall housing 97, and the housing pressure-fit section HP.

Specifically, in the first embodiment, the sleeve 22, which is of the same material (i.e., iron) as the outer wall housing 97, is pressure-fitted to a position on the inner diameter side of the housing pressure-fit section HP of the aluminum divider wall housing 81.

As described above, this creates a structure in which the divider wall housing 81 is sandwiched from within and without by the outer wall housing 97 and the sleeve 22, which are of the same material (i.e., iron), preventing reductions in pressure fitting force (pressure fitting contact area) at the housing pressure-fit section HP. In other words, although there is a dividing position, the housing pressure-fit section HP at the dividing position ensures a seal effect isolating the dry space DS and the outer space OS from each other.

As described above, isolating effects comparable to those yielded by the comparative example are yielded by the first embodiment despite the motor housing being divided into two.

Next, the effects of the first embodiment will be described.

The hybrid drive force transmission device according to the first embodiment yields the following effects.

(1) In the drive force transmission device (hybrid drive force transmission device), which is provided with a motor (motor/generator 9) disposed in a dry space DS within a motor housing, a transmission (V-belt-driven continuously variable transmission mechanism 42) disposed in a wet space WS within a transmission case 41, a motor case (unit case 21) that covers the outer periphery of the motor housing and is coupled to the transmission case 41, forming an outer space OS between the motor case and the motor housing, and a seal member (O-ring 10), interposed between the motor case (unit case 21) and the motor housing, for isolating the wet space WS and the outer space OS from each other, the motor housing is divided into a divider wall housing 81 dividing off the wet space WS and an outer wall housing 97 dividing off the outer space OS, the divider wall housing 81 being constituted by a material lighter than that of the outer wall housing 97 and integrally coupled thereto, and the position at which the divider wall housing 81 is divided from the outer wall housing 97 is set nearer the dry space DS than the seal member (O-ring 10)(FIG. 4).

As a result, the motor housing is capable of isolating the wet space WS and the dry space DS from each other while achieving a balance between reducing weight and meeting strength requirements. This contributes to reducing the weight of the hybrid drive force transmission device.

(2) The dividing position between the divider wall housing 81 and from the outer wall housing 97 is set nearer the seal member (O-ring 10) than the motor pressure fitting surface 97b to which the circumferential surface of the stator 94 of the motor (motor/generator 9) is pressure-fitted.

As a result, in addition to effect (1) described above, it is possible to pressure-fit the stator 94 of the motor (motor/generator 9) to the outer wall housing 97 without having to divide the pressure-fitting surface, and to hold the stator 94 against the outer wall housing 97 with the same pressure fitting force as if a single integrated motor housing were used.

(3) The dividing position between the divider wall housing 81 and the outer wall housing 97 is a position such that the motor-abutting surface 97c abutting the end surface of the stator 94 of the motor (motor/generator 9) is divided into two inside and outside with respect to the radial direction, and the divider wall circumferential division surface 81a and the outer wall circumferential division surface 97a formed at the respective dividing positions are pressure-fitted together to form an integrally joined housing pressure-fit section HP.

As a result, in addition to effect (2) described above, the divided divider wall housing 81 and outer wall housing 97 can be pressure-fitted to each other to form an integrated whole without increasing the number of parts and with minimal changes in design.

(4) The sleeve 22 of the same material as the outer wall housing 97 is disposed at a position on the inner diameter side of the housing pressure-fit section HP of the divider wall housing 81.

As a result, in addition to effect (3) described above, the divider wall housing 81 is sandwiched from within and without by the outer wall housing 97 and the sleeve 22, which are of the same material, making it possible to prevent reductions in pressure fitting force (pressure fitting contact area) at the housing pressure-fit section HP regardless of changes in temperature.

The foregoing has been a description of a first embodiment of the drive force transmission device according to the present invention, but the specific configuration of the present invention is not limited to these embodiments, and various modifications and additions may be made to the design to the extent that they do not depart from the spirit of the invention as set forth in the claims.

In the first embodiment, an example was given in which the position at which the divider wall housing 81 is divided from the outer wall housing 97 is a position dividing the motor-abutting surface 97c abutting the end surface of the stator 94 of the motor/generator 9 into two inside and outside with respect to the radial direction. However, the specific dividing position is not limited to that of the first embodiment as long as the dividing position between the divider wall housing and the outer wall housing is set nearer the dry space than the seal member.

In the first embodiment, an example was given in which the divider wall housing 81 and the outer wall housing 97 are pressure-fitted to form an integrated whole. However, the divider wall housing and the outer wall housing may also be integrally coupled using another method, such as non-pressure bonding, welding, or bolting.

In the first embodiment, an example was given in which a sleeve 22 of the same material as the outer wall housing 97 is pressure-fitted to a position on the inner diameter side of the housing pressure-fit section HP of the divider wall housing 81. However, a sleeve is disposed at a position on the inner diameter side of the housing pressure-fit section of the divider wall housing via casting.

In the first embodiment, an example of an application to a hybrid drive force transmission device equipped with an engine, a motor/generator, and a belt-driven continuously variable transmission was given. However, the present invention may also be applied to the drive force transmission device of an electrically powered vehicle comprising only a motor/generator as a drive source and a fixed gear ratio transmission or stepped transmission as a transmission, such as an electric vehicle or a fuel cell vehicle.

The invention claimed is:

1. A drive force transmission device, comprising:
   a motor housing;
   a transmission case;
   a motor disposed in a dry space within the motor housing;
   a transmission disposed in a wet space within transmission case;
   a motor case covering an outer periphery of the motor housing and being coupled to the transmission case, so as to form an outer space between the motor case and the motor housing; and
   a seal member, interposed between the motor case and the motor housing, the seal member isolating the wet space and the outer space from each other,
   the motor housing being divided into a divider wall housing dividing off the wet space and an outer wall housing dividing off the outer space, the divider wall housing being a material lighter than a material of the outer wall housing and integrally coupled thereto, and
   the divider wall housing being divided from the outer wall housing at a position nearer to the dry space than the seal member.

2. The drive force transmission device according to claim 1, wherein
   the divider wall housing and the outer wall housing being divided at a dividing position, the dividing position being nearer the seal member than a motor pressure fitting surface to which a circumferential surface of a stator of the motor is pressure-fitted.

3. The drive force transmission device according to claim 2, wherein
   the divider wall housing and the outer wall housing being arranged such that the dividing position between the divider wall housing and the outer wall housing is a position such that a motor-abutting surface abutting an end surface of the stator of the motor is divided into radially inside and outside portions, and a divider wall circumferential division surface and an outer wall circumferential division surface formed at the dividing position are pressure-fitted together to form an integrally joined housing pressure-fit section.

4. The drive force transmission device according to claim 3, wherein
   a sleeve is disposed at a position on an inner diameter side of the housing pressure-fit section of the divider wall housing, the sleeve being formed from the same material as the outer wall housing.

* * * * *